April 9, 1940.  E. C. McDANIEL  2,196,338
TRAILER FRAME
Original Filed Oct. 4, 1937   3 Sheets-Sheet 2
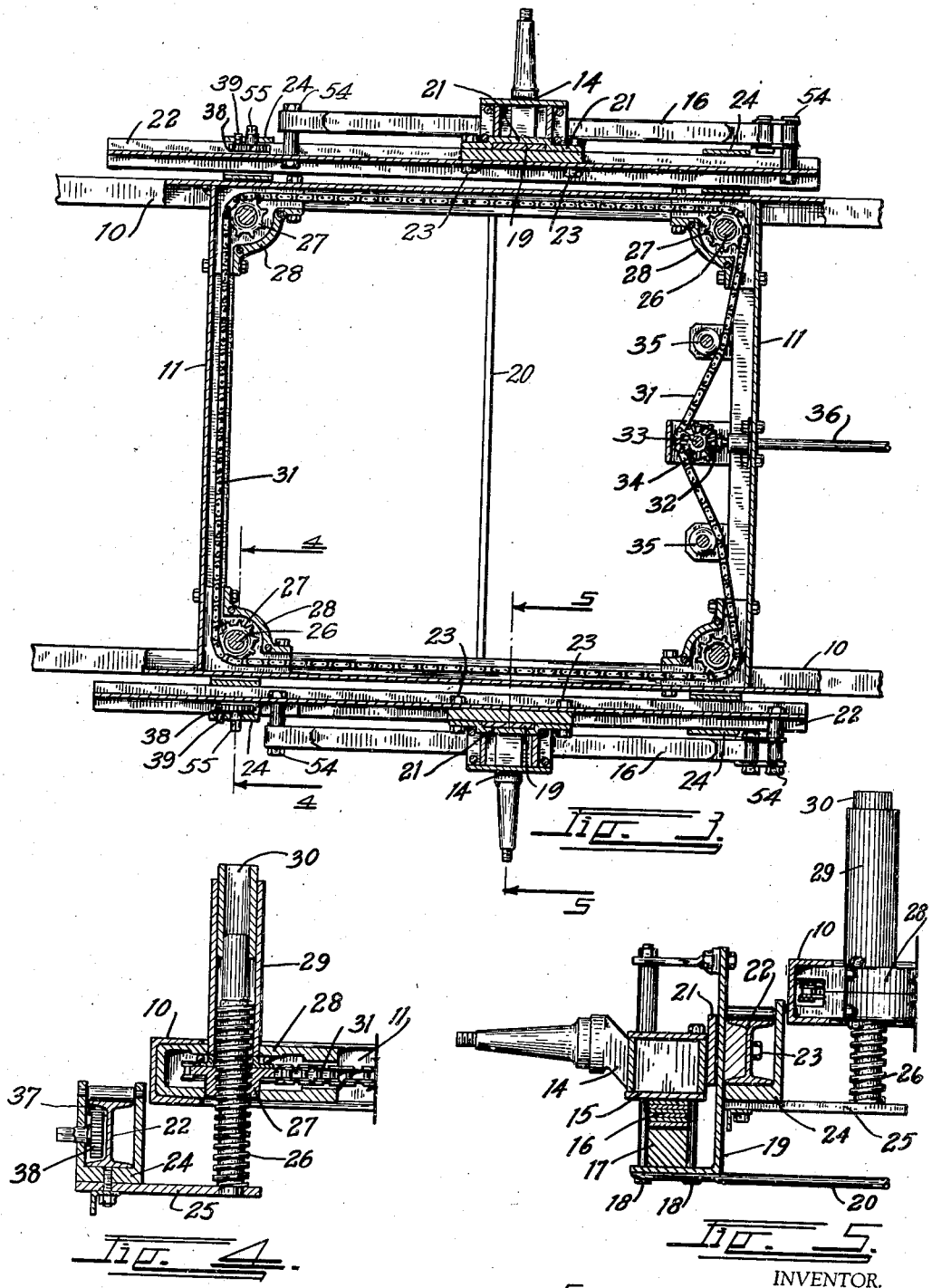
INVENTOR.
ERNEST C. McDANIEL
BY
ATTORNEY.

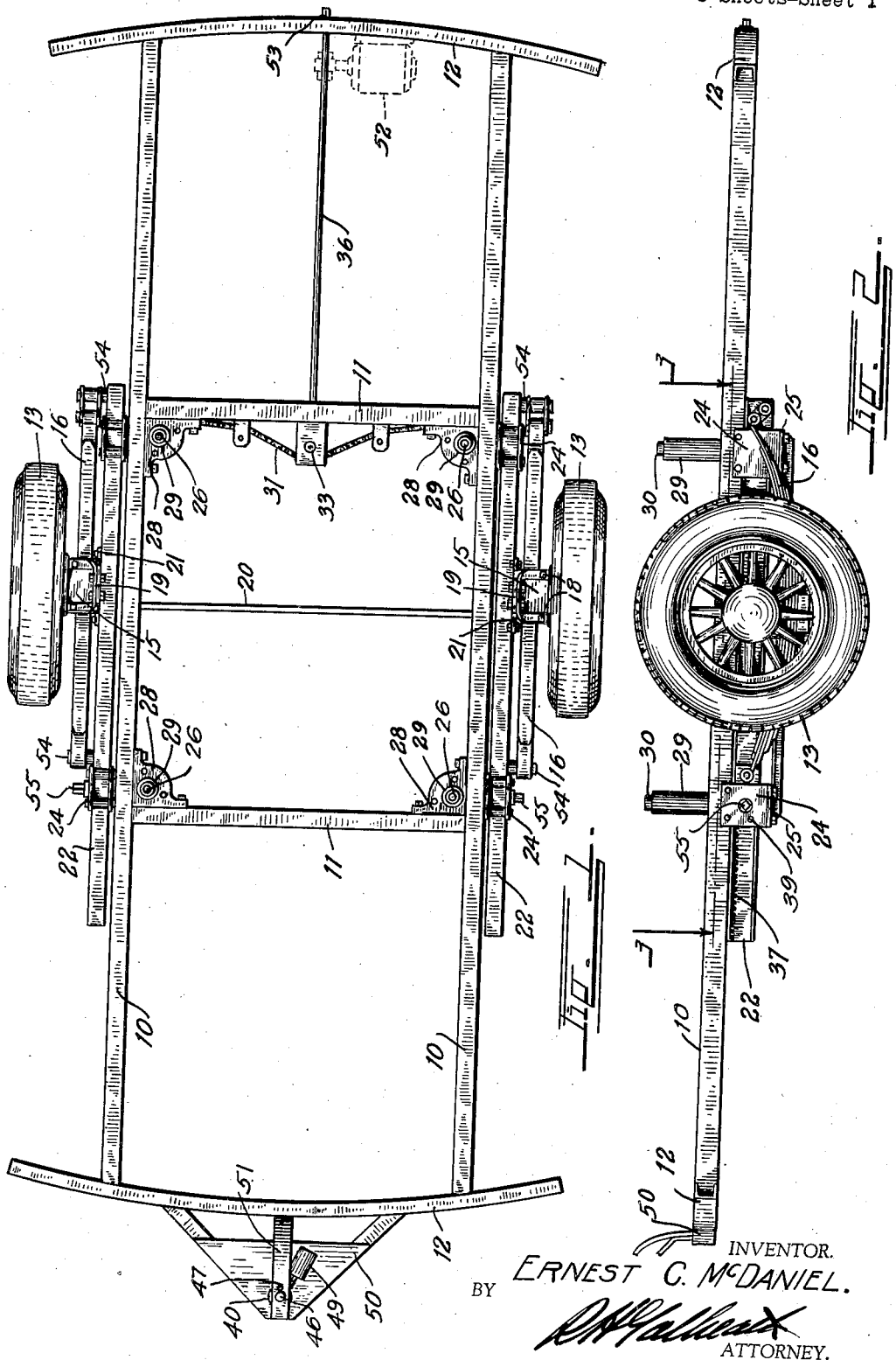

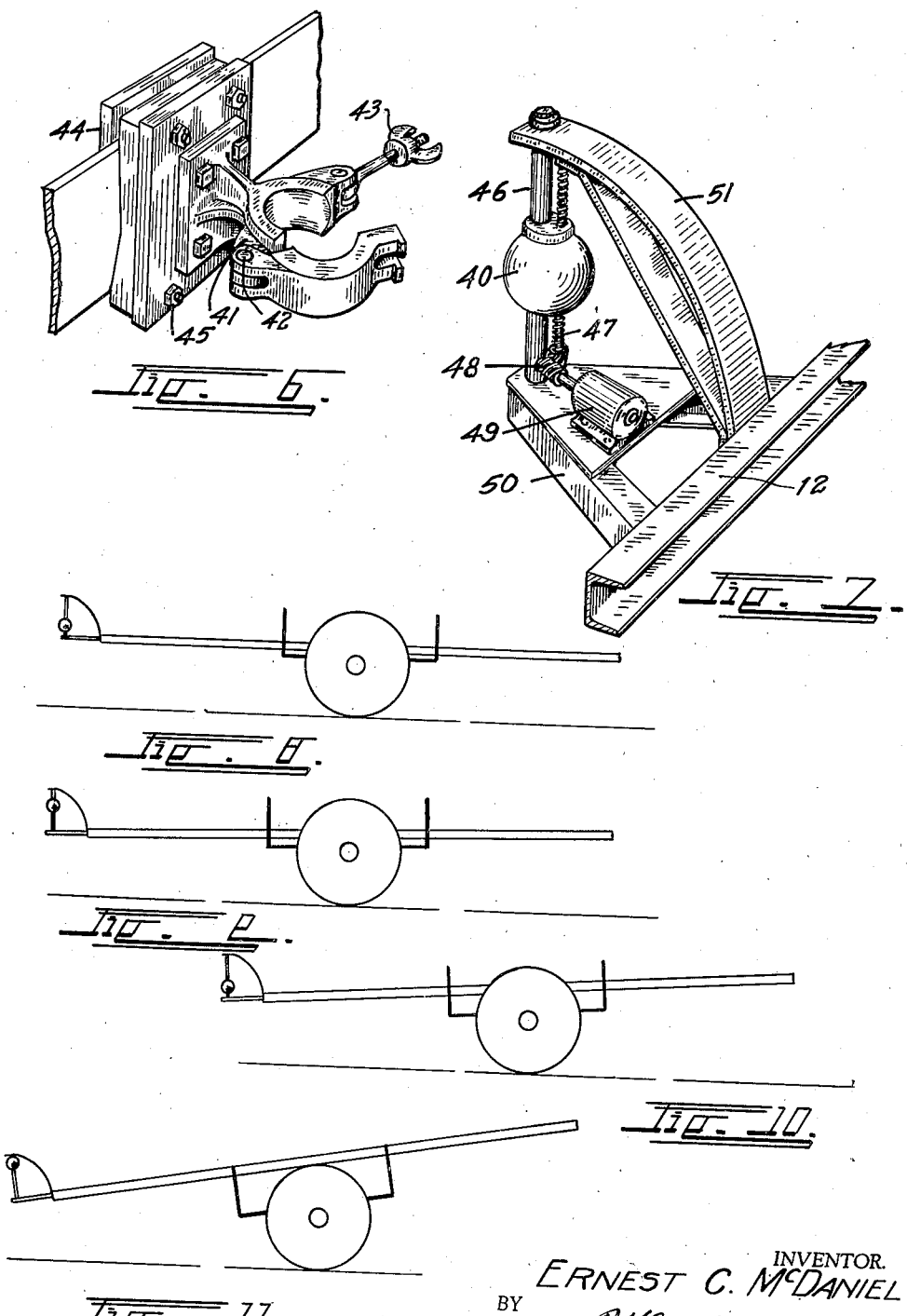

Patented Apr. 9, 1940

2,196,338

UNITED STATES PATENT OFFICE 2,196,338

TRAILER FRAME

Ernest C. McDaniel, Denver, Colo., assignor, by mesne assignments, to Trailwagons Incorporated, Denver, Colo., a corporation of Colorado Application October 4, 1937, Serial No. 167,105
Renewed August 26, 1939

2 Claims. (Cl. 280—33.4)

This invention relates to a chassis or frame for mounting the body of a trailer, more particularly of the house type.

The usual trailers of the house type are relatively long and are usually mounted on a single pair of wheels. They are designed to be pivoted at their front extremities to the back of the towing vehicle which supports a portion of the weight. This method of mounting, and the extreme length, causes the rear extremity of the trailer to strike the ground when the towing vehicle rises over humps or when the trailer wheels drop into depressions. This is particularly noticeable when crossing gutters or curbs to enter filling stations along streets or roadways. When the wheels enter the gutter the rear trailer extremity will often strike and drag on the street or road. To eliminate this damage to trailers, some trailers are provided with drag plates at the rear.

The principal object of this invention is to provide a mounting for the trailer which will be, at all times, under the control of the driver so that he may raise either the forward or rearward extremity of the trailer to allow it to clear road irregularities and other obstructions whenever necessary.

The usual trailer is mounted upon a pair of wheels located at the normal point of balance. Any unequal loading of the trailer will cause it to either bear down upon or tend to lift the towing vehicle. This causes uneven riding and interferes with the control and traction of the tow car.

Another object of this invention is to provide means whereby the trailer can be balanced upon its wheels after it is loaded so as to place any desired amount of weight upon the towing vehicle regardless of the distribution of the load in the trailer.

A still further object is to provide a mounting with which a relatively low center of gravity may be obtained with a maximum of road clearance and to provide an elevating mechanism by means of which the entire trailer can be uniformly elevated above the road without subjecting it to twisting or bending strains or distortions.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawings and throughout the description.

In the drawings:

Fig. 1 is a plan vew of the improved trailer chassis.

Fig. 2 is a side view thereof.

Fig. 3 is a horizontal section or plan through the middle portion of the mounting taken on the line 3—3, Fig. 2.

Fig. 4 is a detail view taken on the line 4—4, Fig. 3.

Fig. 5 is a detail section taken on the line 5—5, Fig. 3.

Fig. 6 is a detail perspective of the trailer hitch which is carried by the towing vehicle.

Fig. 7 is a similar view of the trailer portion of the hitch.

Figs. 8 to 11, inclusive, are diagrams illustrating various positions in which the chassis may be placed.

The improved trailer chassis consists of a main frame formed of longitudinal channel members 10 and cross channel members 11. The members 10 are joined at their ends by means of curved bumper bars 12.

The main frame is supported from a pair of wheels 13. Each wheel 13 is carried on an axle stub 14 extended from a clamping frame 15 supported from an elliptical leaf spring 16. The spring 16 and the frame 15 are clamped together upon a spacing block 17 by means of clamp bolts 18.

The clamp bolts 18 secure the entire assembly to an L-shaped spring plate 19. The spring plates 19 at the opposite sides of the chassis are secured together by means of a suitable tie rod 20.

The vertical portions of the plates 19 pass through a plate guide 21 which is indented to form a guide channel for the spring plate 19 as shown in Fig. 3. Each plate guide 21 is clamped to an I-beam 22 by means of suitable bolts 23. The extremities of the springs 16 are also secured to the I-beams 22 upon suitable spring studs 54.

The I-beams are longitudinally movable with reference to the main frame of the chassis. Each I-beam is slidably mounted in a pair of brackets 24. Each bracket 24 is carried from a bracket plate 25. Each of the bracket plates is secured on the bottom of a jack screw 26.

Each of the four jack screws passes upwardly through a sprocket nut 27. The sprocket nuts 27 are carried in sprocket housings 28 at the intersections of the frame members 10 and 11. The upper extremity of each jack screw passes into a jack screw housing 29 provided with a bearing bushing 30 for the upper extremity of the jack screw.

All of the sprocket nuts 27 are caused to rotate in unison by means of an endless sprocket chain 31 which passes about all of the sprockets and is concealed within the channel sides of the members 10 and 11. The chain can be moved in either desired direction by means of a drive sprocket 32 mounted on a stub shaft 33 with a bevel pinion 34. An idler sprocket 35 holds the chain about the drive sprocket 32. The bevel pinion and the stub shaft 33 are rotated from a control shaft 36.

Thus it can be seen that when the control shaft 36 is rotated in one direction it will cause all of the sprocket nuts 27 to rotate in unison to thread themselves upwardly thereby raising the chassis. When rotated in the opposite direction, it will cause the sprocket nuts 27 to travel simultaneously downward on the threaded shafts 26 to lower the chassis.

A toothed rack member 37 is formed beneath the upper flange of each of the I-beams 22. In each of the forward brackets 24 is a rack pinion 38 in mesh with the rack. Each pinion 38 is fixed on a stub shaft 55 which is journalled in the side plate of the bracket 24 and which extends outwardly to a square extremity for receiving a crank or other operating tool. It can be seen that if these rack pinions 38 are rotated they will move the I-beam forward or back thereby changing the relative position of the wheel axis along the main frame to balance the latter under any condition of loading.

Each of the forward brackets 24 is provided with a set screw 39 which when tightened engages the I-beam to hold the latter in its adjusted position.

The frame is attached to the desiring vehicle by means of a ball 40 which fits into a ball socket member 41. One half of the ball socket member 41 is hinged at 42 so that it may be swung away to release the ball 40 when it is desired to disconnect the trailer. A clamp bolt 43 closes the ball socket about the ball 40 when the trailer is connected. The ball socket is provided with suitable attachment devices for attaching it to the towing vehicle. As illustrated, it is formed with clamp plates 44 and clamp bolts 45 by means of which it can be attached to the bumper of the towing vehicle. It may, however, be attached in any other desired manner.

The ball is carried on a vertical, smooth shaft 46 which serves to transmit the traction to the trailer. A vertical threaded shaft 47 transmits the weight of the trailer to the ball. The threaded shaft is rotatable and is threaded through the ball 40. It may be rotated from a worm wheel 48 driven from a suitable electric motor 49. If the motor is not desired, the threaded shaft could be rotated by hand. The lower extremities of these shafts are carried upon a forwardly projecting chassis bracket 50 and the upper extremities thereof are braced through the medium of a brace member 51.

If desired, the control shaft 36 can also be operated through the medium of an electric motor and worm gear, as indicated in broken line at 52, or it can be provided with a squared extremity, as shown at 53 for hand operation.

In Figs. 8, 9, and 10 some of the possible positions of a trailer employing the improved mounting are illustrated by diagrams.

In Fig. 8 the chassis frame is shown in its usual horizontal stationary position with the ball 40 at the bottom of its shafts and with the jack screws 26 threaded into the jack housings 29. In this position the bracket plates 24 bear against the bottom of the frame members 10 to directly support the weight of the vehicle and to avoid bending strains in the plates 24.

In Fig. 9 the ball shafts have been moved downward through the ball 40 to tilt the nose of the trailer downward and slightly lift the tail. This has been found to be the most stable towing position.

In Fig. 10, the nose is up to its full heighth and the jack screws have been operated to lift the tail over obstructions.

In Fig. 11 we see the maximum elevation of the tail for passage over high banks and other obstacles.

Thus the operator has the position of the rear of the trailer under his control at all times. If he is crossing a depression or ditch where he knows the rear might strike, he can elevate the rear from his driver's seat any desired amount to clear the obstruction.

It is desired to call attention to the fact that the construction of this mounting does not interfere with the road clearance at the trailer wheels. This remains the same at all times.

I claim:

1. In combination, a trailer frame; means for attaching said trailer frame to a towing vehicle; a pair of vertically adjustable members extending downward from said frame at each side thereof; a bracket member extending outwardly from each vertically adjustable member; a longitudinally movable beam member slidably mounted in each pair of brackets and lying parallel to said trailer frame and at each side thereof; a leaf spring lying along the outer face of each beam member and secured at its extremities thereto; a wheel frame secured to each spring intermediate its extremities; means for mounting a wheel on each wheel frame; and means for shifting said beam members forward and back to change the position of said wheels and springs along said trailer frame.

2. In combination, a trailer frame; means for attaching said frame to a towing vehicle; a pair of brackets extending outward at each side of said frame; a longitudinally movable beam member mounted in each pair of brackets; a leaf spring secured at its extremities to each beam member and lying parallel thereto; a wheel frame secured to each spring intermediate its extremities; means for mounting a wheel on each wheel frame; means for shifting said beam members forward and back to change the position of said wheels and springs along said trailer frame; and vertical guide means carried by each beam member for guiding the spring movements of said wheel frames vertically.

ERNEST C. McDANIEL.